(No Model.)

I. HAINES.
CORN PLANTER.

No. 360,345. Patented Mar. 29, 1887.

Witnesses.
W. W. Wilson
Horace H. Moier

Inventor.
Isaiah Haines

UNITED STATES PATENT OFFICE.

ISAIAH HAINES, OF PORTER, CASS COUNTY, MICHIGAN.

CORN-PLANTER.

SPECIFICATION forming part of Letters Patent No. 360,345, dated March 29, 1887.

Application filed January 31, 1887. Serial No. 226,041. (No model.)

*To all whom it may concern:*

Be it known that I, ISAIAH HAINES, residing in the township of Porter, in the county of Cass, State of Michigan, United States, have invented a new and useful Machine for Planting Corn and other Seeds, of which the following is a specification, reference being had to the accompanying drawings, forming a part hereof.

My invention relates to that class of corn and seed planters worked wholly by hand.

The objects of my improvement are, first, to provide a corn and seed planter which will plant the seed at any required depth in the ground; second, to provide a planter in the use of which the seed may be hand-dropped, thereby insuring any given number of grains to the hill; third, to attain the objects set forth above without the use of a hoe. I attain these objects by the mechanism represented in the accompanying drawings, in which—

Figure 1 is a perspective view and Fig. 2 is a sectional view.

My invention consists of a wedge-shaped box or hopper, represented and illustrated in annexed drawings.

A represents a hand-hold in triangular side, by which the machine is carried when in use; D, a movable quadrilateral side secured in its place by screws on opposite sides at C and by spring E, as shown in Fig. 2; B, an iron shoe or plating on bottom of machine; F, an open hopper.

Figure 1:
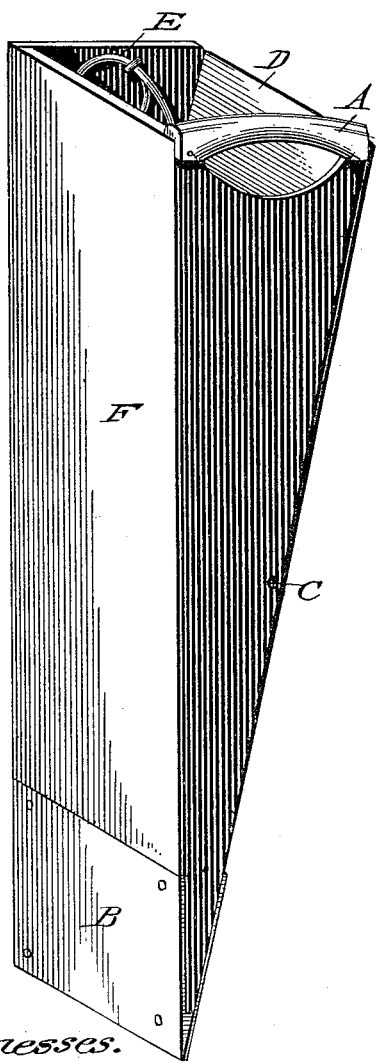
Fig. 1 shows machine (closed ready to receive seed) as plunged into the ground.
Figure 2:
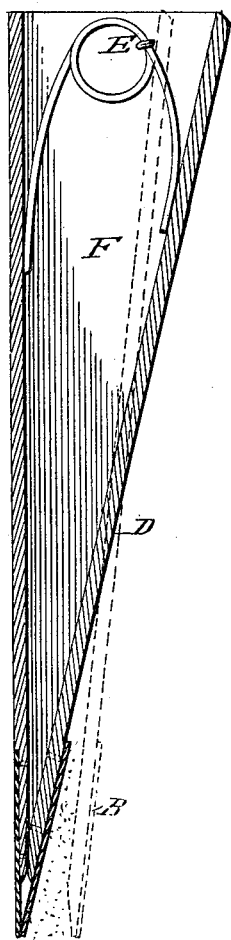
Fig. 2 shows machine (open as drawn from the ground) depositing seed.

In use the machine is taken in the hand by hand-hold A, the seed dropped into the hopper, and the shoe plunged into the ground, the thumb pressed on the top of side D, causing machine to open at the bottom and drop seed. As the machine is raised out of the ground the thumb is removed from side D and the machine closed by spring E.

Having fully described my invention, what I desire to claim and secure by Letters Patent is—

The hopper or wedge-shaped box, with hand-hold A, movable side D acting on screws C, spring E, and the shoe or plating B, all as substantially set forth and described.

ISAIAH HAINES.

Witnesses:
W. W. WILSON,
HORACE H. MOSIER.